July 13, 1965
W. L. GOVAN
3,194,037
PNEUMATIC CONTROL SYSTEM
Filed Nov. 26, 1962
8 Sheets-Sheet 3
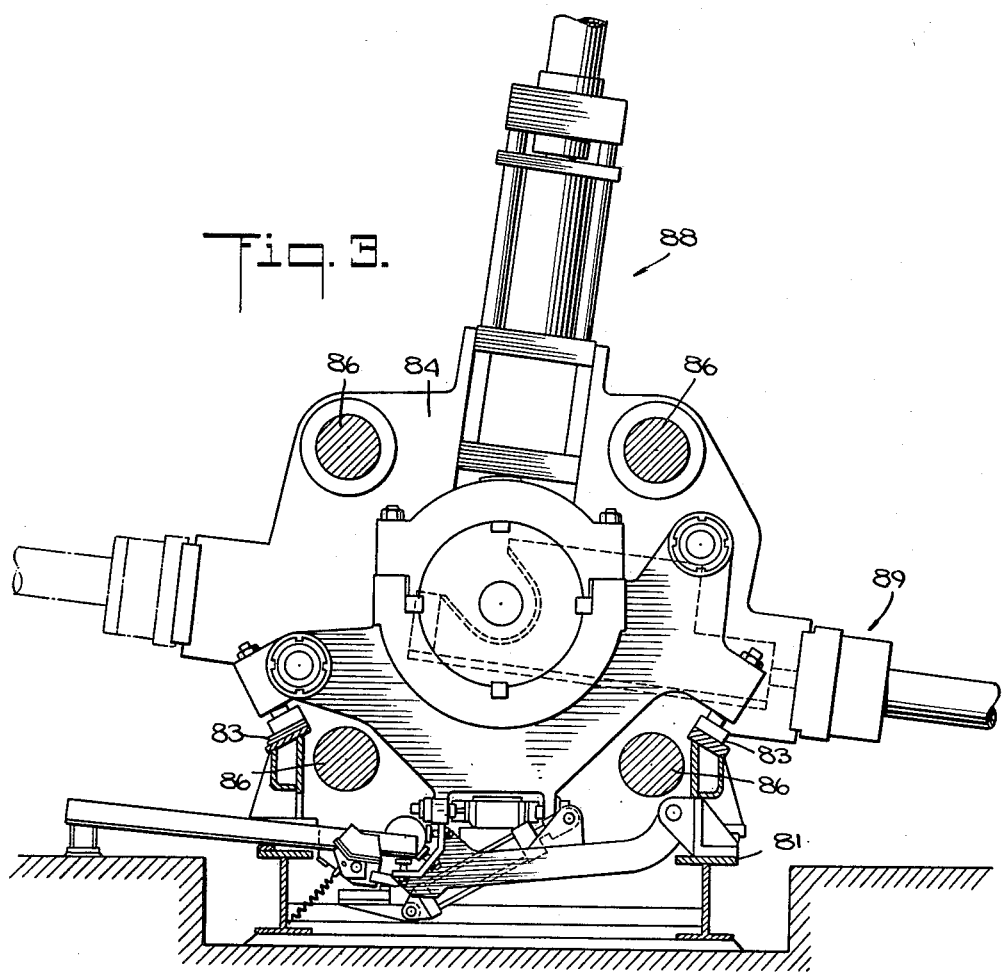
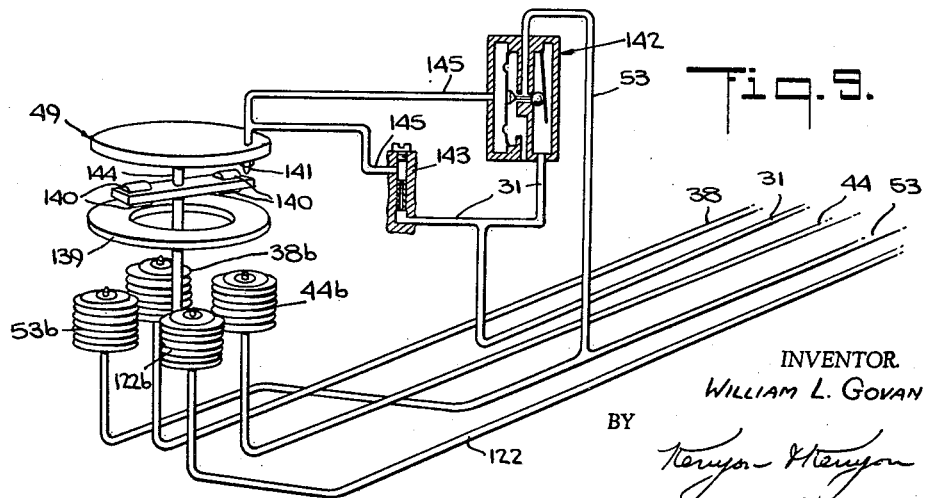
INVENTOR.
WILLIAM L. GOVAN
BY
Kenyon & Kenyon
ATTORNEYS July 13, 1965  W. L. GOVAN  3,194,037
PNEUMATIC CONTROL SYSTEM
Filed Nov. 26, 1962  8 Sheets-Sheet 4

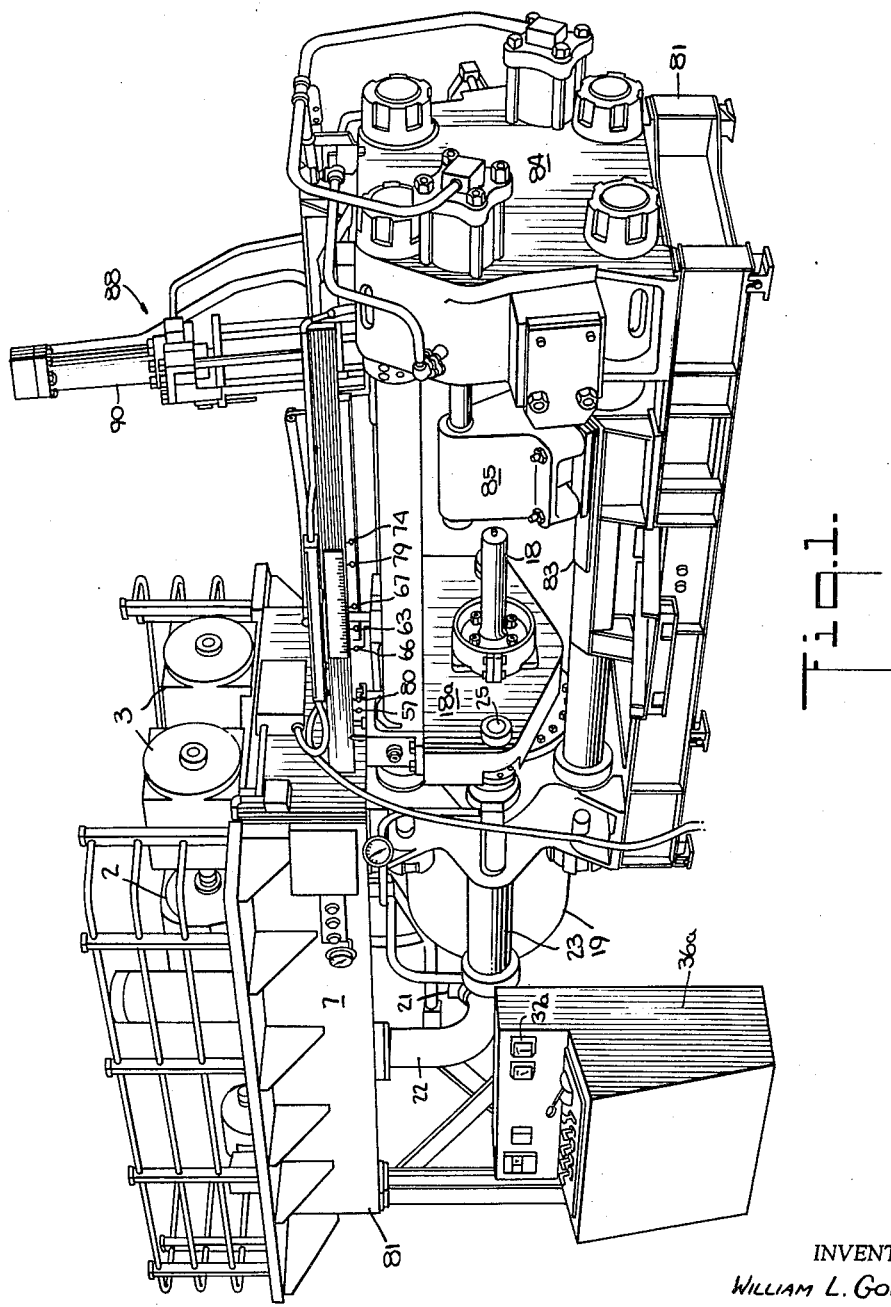

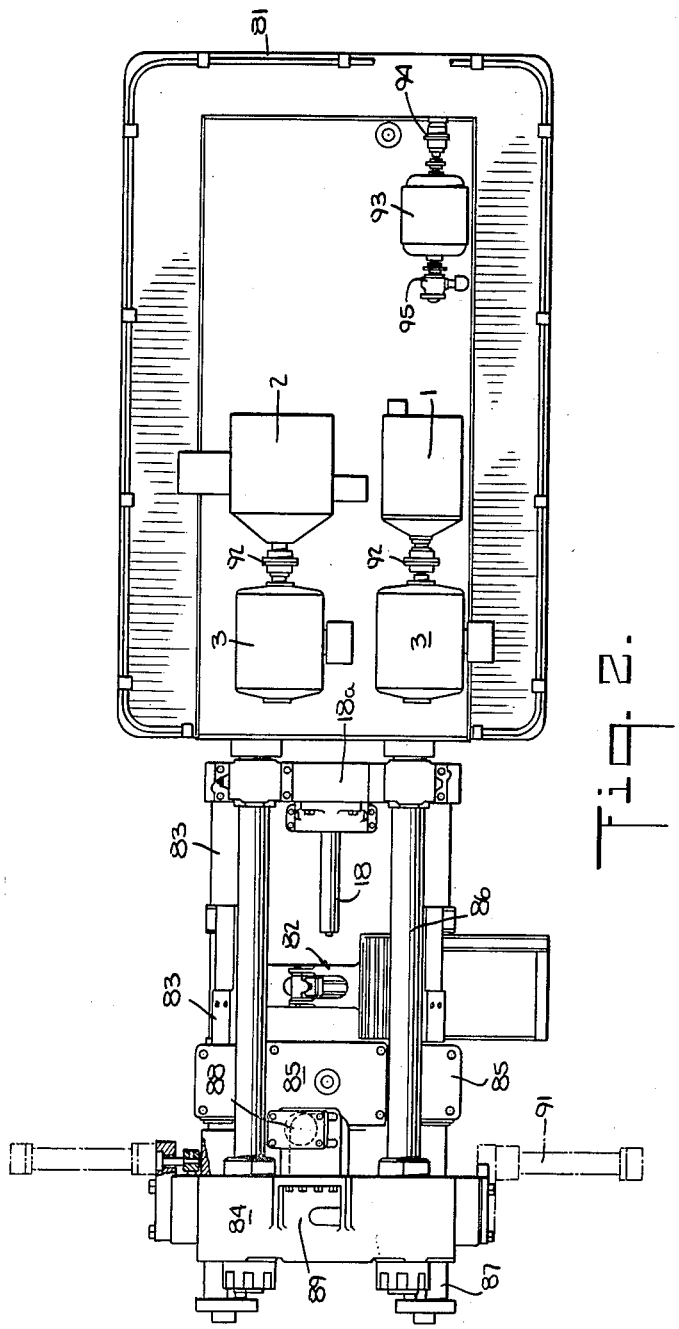

INVENTOR.
WILLIAM L. GOVAN
BY
Kenyon & Kenyon
ATTORNEYS

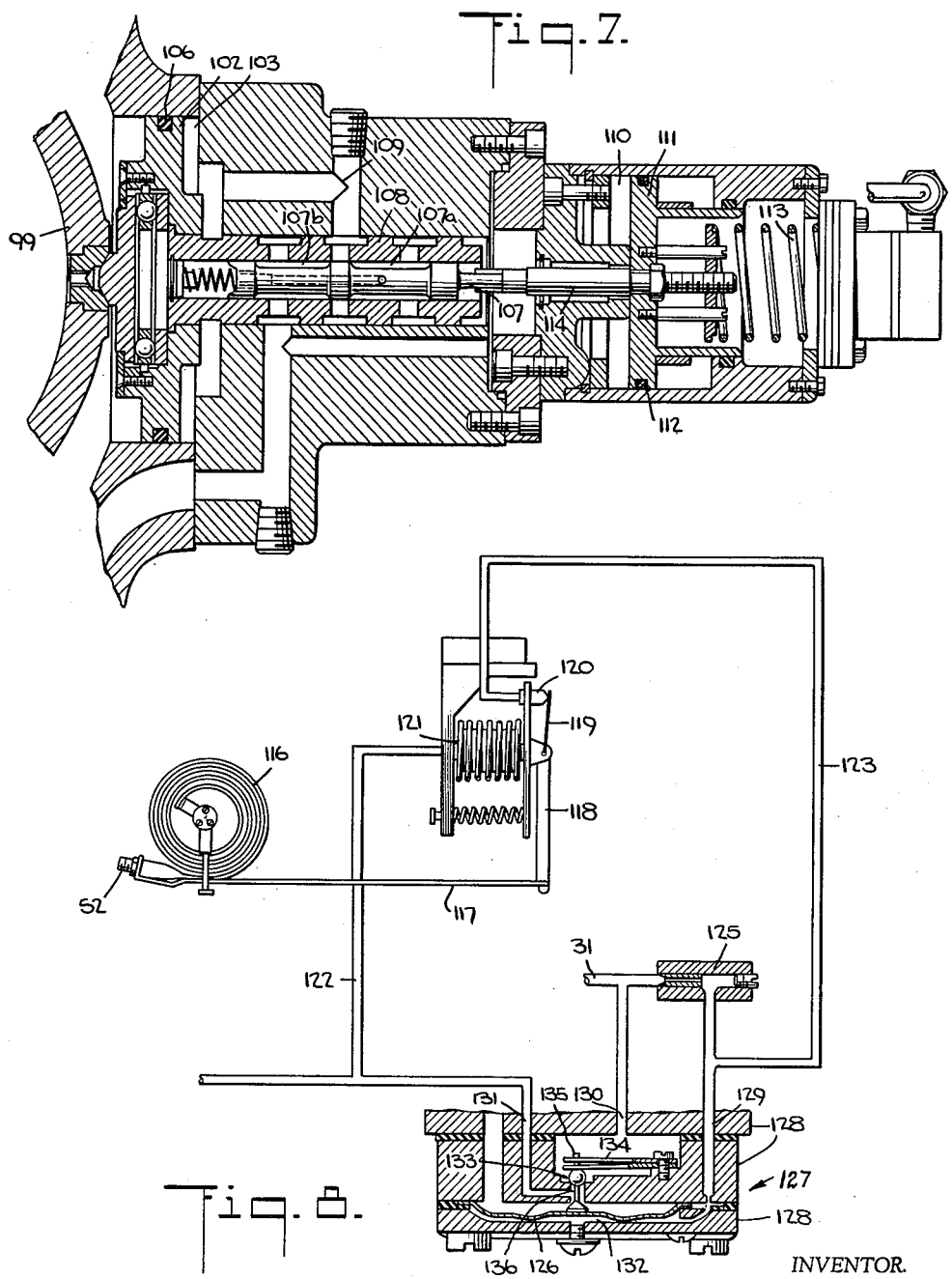

INVENTOR
WILLIAM L. GOVAN
ATTORNEYS 3,194,037
PNEUMATIC CONTROL SYSTEM
William Livingston Govan, Brighton, N.Y., assignor to Farrel Corporation, a corporation of Connecticut
Filed Nov. 26, 1962, Ser. No. 239,917
23 Claims. (Cl. 72—24)

This invention relates to a pneumatic control system for reversible variable displacement pumps which may be connected to operate large industrial machinery. It has been found well suited to the control of the pumps and hydraulic cylinders of a high pressure extrusion press, especially including the press ram.

The operator of a modern metal extrusion press handles a piece of machinery weighing upwards of a hundred thousand pounds which must operate daily for years at several thousand tons of extrusion pressure. It is absolutely essential that the massive parts which handle these pressures be precisely and reliably controlled, and that the operator have every convenience in exercising this control. With the forces involved, just one wild uncontrolled movement—as from a short circuit—can not only ruin the press but may seriously or fatally injure the operator. Even the ordinary and programmed movements must be smoothly controlled for in these machines the shock of take-up or hitting a limit can reach dangerous proportions.

At the same time, there is a pressing business need to increase the output of such expensive equipment and for the increasingly rapid cycles of operation which this requires.

This need explains the repeated attempts which have been made to conceive of improved press controls. The problem is made more difficult by the requirement that the controls operate without failure amid the dirt and vibration of a metal extrusion shop and by the practical requirement that, even while handling more rapid operations, the controls have the dependability of simplicity and be serviceable in the field.

The present invention of a pneumatic control system meets this need. Simplicity and smooth operation are achieved with a safe and rapid press control that can provide any desired rate of press or ram operation.

In brief summary, reversible variable displacement hydraulic pumps are connected to power the ram of a metal extrusion press and such other press cylinders as it is desired to operate with the main high pressure system. These may include, for example, the stub shear and container cylinders.

The pumps are provided with pneumatic control means that include a spring returned air cylinder which is mechanically and hydraulically connected to vary pump displacement to cause the pump output to vary from full flow at one port to full flow at the other as the signal air pressure supplied to the air cylinder varies through its control range. When connected to the ram, this causes a consequent movement from full speed in one direction to full speed in the other. The movement of the ram cylinder may thus be controlled by selecting the appropriate source of signal air pressure to cause the desired movement. The invention is described below on a press provided with small positioning cylinders that make possible still further control of ram speed and economize on the use of high pressure fluid.

It is an advantage of the pneumatic control system that different sources of signal pressure can be supplied to the pump control means through a simple air line. Indeed, any number of air regulators preset for desired signal pressures may be incorporated into the control system and simply connected in turn to the common control line to cause pump delivery at any desired rate in either direction and without loss of the simplicity that contributes to the system's dependability. These regulators may be manually connected to cycle the press ram or they may be controlled by a limit switch system to automatically cycle an entire cycle or sequential portions of a cycle.

A particular advantage of this pneumatic control system is that an otherwise automatic cycle may provide for one or several manually operated remote control stations to control the pump and ram operation during the crucial high pressure extrusion stroke for convenience and safety without complexity.

During both automatic and manual operation, the control signal pressure to the trouble-free spring returned air cylinder of the pump control may be sensed by gauge and pressure sensitive switches to provide a continuous check on the system's operation.

In contrast to other essentially on-off control systems, which grow complicated in the attempt to produce a smooth evenly variable response in the ram speed, the air control of this invention can readily incorporate the infinitely variable air pressure regulator and the control lines themselves help provide smooth acceleration and deceleration as the elasticity of the contained air cushions changes in the signal pressure to the pump. With the heavy parts and high inertias involved in rapid operation, this is important lest parts be sprung and pipes burst with too rapid accelerations or decelerations.

This pneumatic control also makes possible relatively simple and trouble free auxiliary systems.

A particularly valuable auxiliary system, one which forms a part of this invention, provides compensation for the apparent pump and system slippage or internal leakage that is realized at operating pressures. It functions to gradually increase the pump's displacement as the pressure rises in the output line so as to maintain that effective output in uniform volume, regardless of the pressure. This maintains a constant ram speed throughout the working stroke, accurately and without continual attention and adjustment by the operator. The importance of this even speed will be apparent when it is realized that the thin extrusion leaves the die at a much faster rate than the ram advances and in the proportion that the billet's cross-sectional area bears to that of the extrusion. Even slight variations in ram speed can produce serious fluctuations in extrusion speed. This causes problems since, to maintain production, the extrusion speed must often be held to maximum possible consistent with a good surface quality on the extrusion. Also, the extrusion speed must be frequently matched to the receiving means or subsequent operations. For example, the speed at which lead sheath is extruded must be matched to the speed of the cable to be covered, and, conversely, the speed at which aluminum cable is extruded must be matched to the speed of the insulating covering.

Other novel features and advantages of this invention will be apparent to those men skilled in this art from the following description of the best mode presently contemplated by the inventor for carrying out his invention.

In the accompanying drawings:

FIGURE 1 is a perspective of a metal extrusion press incorporating this invention.

FIGURE 2 is a plan view of a metal extrusion press incorporating this invention.

FIGURE 3 is a partial view of the main ram and other parts of the press of FIGURE 1, and particularly the end platen.

FIGURE 7 is a drawing of a pneumatic pump control means for the pumps of FIGURE 6.

FIGURE 8 is a schematic drawing of the transducer of the pneumatic control system of FIGURE 5.

FIGURE 9 is a schematic drawing of the computer of the pneumatic control system of FIGURE 5.

The metal extrusion press

Figure 4:
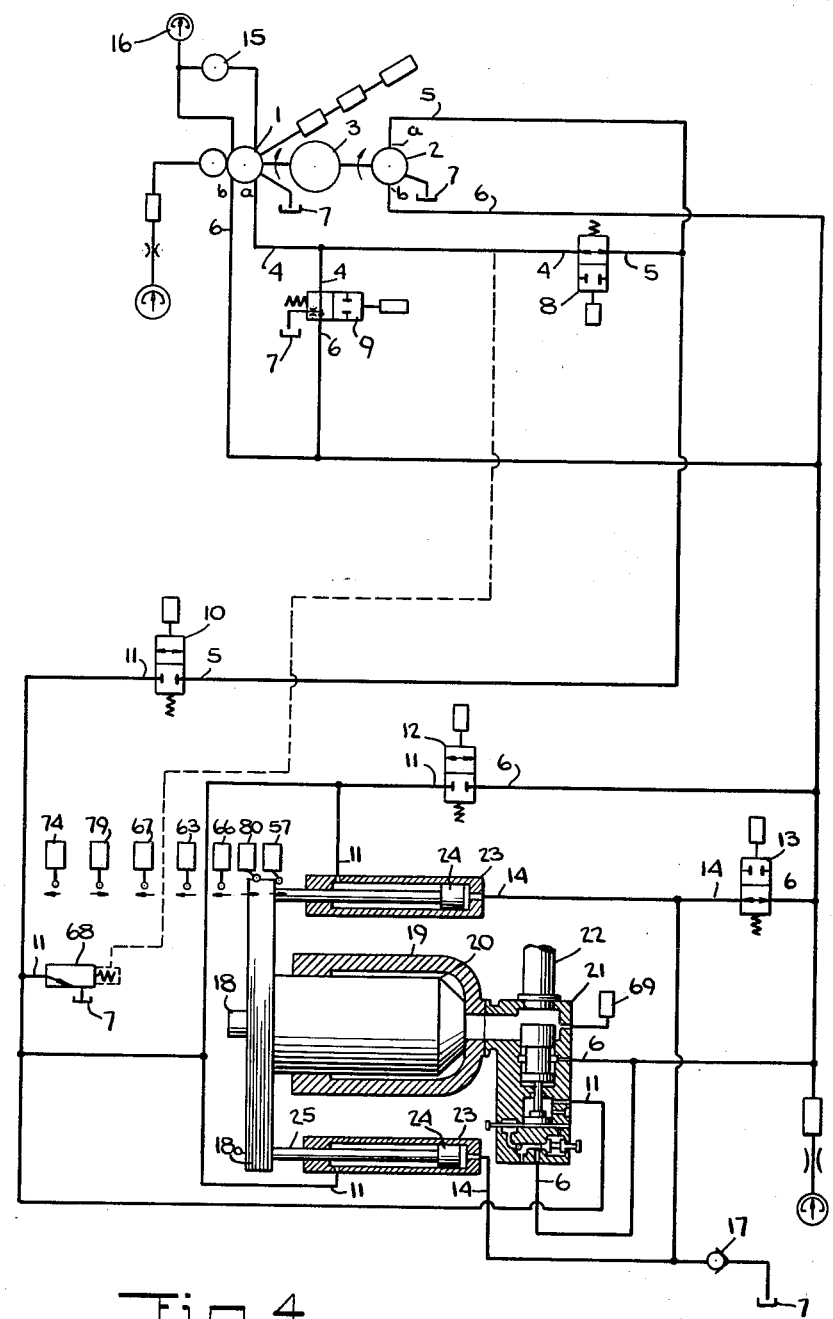
FIGURE 4 is a schematic drawing of a pair of reversible variable displacement hydraulic pumps, the main ram of an extrusion press, and the associated hydraulic circuitry and limit switch locations.
Figure 5:
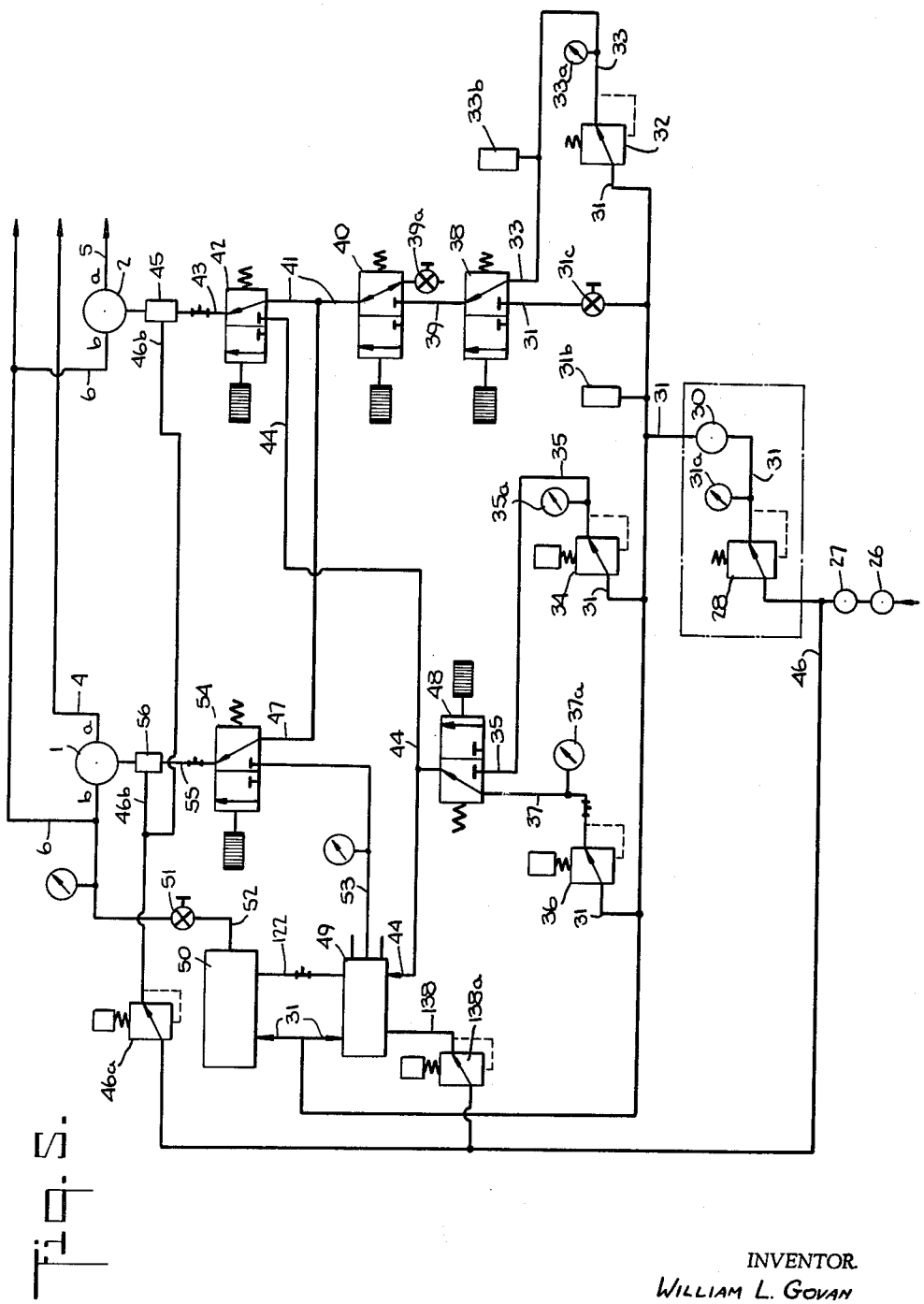
FIGURE 5 is a schematic drawing of a pneumatic pump control system for the press of FIGURE 1.

A metal extrusion press incorporating the pneumatic control system of this invention is shown in FIGURES 1, 2 and 3. On the frame 81 are mounted the main ram hydraulic cylinder 19 containing piston 20 and the ram 18. Alongside the main ram cylinder, the side or positioning cylinders 23 containing their pistons 24 connecting rods 25 which power the same ram stem 18 through the crosshead 18a. A billet loader 82 is positioned below and between the press ways 83 and the tie rods 86. The container 85 rides on press ways 83 mounted on the press frame 81 and is powered by cylinders 87. An end shear assembly 88 is mounted on the end platen 84 above the die slide assembly 89 which is also mounted on the end platen 84. The shear and die slide are powered by cyilnders 90 and 91 respectively. Cylinder 91 may be located on either side of the machine as is convenient.

An elevated platform above the main ram cylinder rests over an oil reservoir 7 which is connected, for example, through line 22 to pre-fill valve 21 and the main ram cylinder 19.

The platform supports motors 3 (represented on schematic drawing as a single motor), and variable displacement pumps 1 and 2 which are driven through flexible couplings 92. The platform also supports motor 93 which drives a low volume high pressure holding pump 94 and a relatively high volume low pressure auxiliary pump 95; these are generally conventional and are therefore not shown on the schematic drawings. Typically both motor 93 and pumps 94 and 95 are considerably smaller than the main variable displacement pumps 1 and 2 and the motor/or motors 3.

The mechanical details for presses of this type will be apparent to those skilled in the art in view of this general disclosure and the discussion below.

The hydraulic system

Two conventional reversible variable displacement pumps 1 and 2 are powered by motor 3. Their output ports "a" are connected to lines 4 and 5, respectively, and their output ports "b" are connected to line 6. The pumps are also connected conventionally to the reservoir 7 and they incorporate the usual gear pumps (not shown).

A two way solenoid controlled hydraulically actuated spring returned valve 8 connects line 4 to line 5 in its returned position and separates them in its actuated position.

A two way solenoid controlled hydraulically actuated spring returned valve 9 connects line 4, and if valve 8 is not actuated also line 5, to line 6 in its returned right hand position, in which the joined lines are also vented to the reservoir 7. In its actuated left hand position, valve 9 separates the lines.

A two way solenoid controlled hydraulically actuated spring returned valve 10 separates line 5 and 11 in its returned position and joins them when actuated.

A two way solenoid controlled hydraulically actuated spring returned valve 12 connects lines 6 and 11 in its actuated position and separates them in its returned position.

A two way solenoid controlled hydraulically actuated spring returned valve 13 separates lines 6 and 14 in its actuated position and connects them in its returned position.

The hydraulic system is provided with the conventional filters, for example, filter 15; gauges, for example gauge 16; check valves, for example, check valve 17; etc., as will be familiar to those skilled in this art and apparent in view of this disclosure.

The main ram itself is shown schematically in the hydraulic circuit with ram 18, main cylinder 19 and piston 20. The cylinder is connected through a pre-fill valve 21 and line 22 to the reservoir 7 as well as to line 6 which supplies high pressure oil to the main cylinder. Auxiliary or positioning cylinders 23, pistons 24, and connecting rods 25 are used to provide relatively rapid ram speeds for positioning under no load conditions. The cylinders are connected at their forward ends to line 11 and at their after ends to line 14.

The complete hydraulic system also includes holding and auxiliary pumps, and the hydraulic billet loader, container, shear and die slide cylinders. As they may be operated conventionally, they are not shown in this system.

The pneumatic system

Air is supplied to the pneumatic control system through a dryer 26, a filter 27 to a regulator 28 which delivers the dry clean air to a lubricator 30 and into line 31 of the control system tubing. The pressure is observable at gauge 31a and a pressure sensitive switch 31b operates to cause the pump to by-pass in the event pressure deviates from the preset limits. The tubing should be fairly small and short to minimize the reaction time of the system and yet contain sufficient volume to permit the elasticity of the air to cushion changes in signal air pressure. This feature is of practical importance as it eliminates the various more complex delaying and response smoothing means which form a part of a basically instantaneous electrical control system. Copper tubing of 3/16 to 1/4 inch in diameter works well to accomplish this smoothing without introducing undue delay into the response time.

Line 31 connects to a idling pressure regulator 32 which is preset to deliver air at a pressure which, when connected to the pump control means, will cause the pumps to have no displacement. This signal pressure is delivered to line 33, where the regulators proper operation may be visually observed at gauge 33a and pressure sensitive switch 33b operates to cause the pumps to by-pass in the event that pressure falls outside preset limits.

Line 31 also connects to manually operated regulator 36 that delivers air to the output line 37, where its operation may be observed on gauge 37a. Manual operation is from console 36a.

Line 31 also connects to manually operated regulator 34 which delivers to line 35 and which may be used alternatively to regulator 36. Its operation may be observed on gauge 35a.

Additional preset regulators may also be included in the circuit and selected for connection to the pump to provide any desired rate of pump delivery and, of course, the basic supply regulator 28 is in itself a source of signal pressure which may be valved to the pump control means.

A two way solenoid actuated spring returned valve 38 connects line 33 to line 39 in its returned lefthand position and connects line 31 to line 39 in its actuated right hand position.

Two way solenoid actuated and spring returned valve 40 caps line 39 in its returned left hand position and at the same time vents line 41 to the atmosphere through manually controlled valve 39a which provides another source of signal pressure. In its actuated right hand position, the valve connects lines 39 and 41.

Two way solenoid actuated spring returned valve 42 connects lines 41 and 43 in its returned left hand position and caps line 44. The valve connects lines 44 and 43 in its actuated or right hand position and caps line 41.

Line 43 supplies signal air pressure to the pneumatic control means 45 on the reversible variable displacement pump 2. The pneumatic pump control means may also be supplied with supplemental air pressure through line 46b, via regulator 46a.

The pump control means 45 cause maximum output at port "b" with high signal pressure and maximum output at port "a" with low signal pressure.

Figure 6:
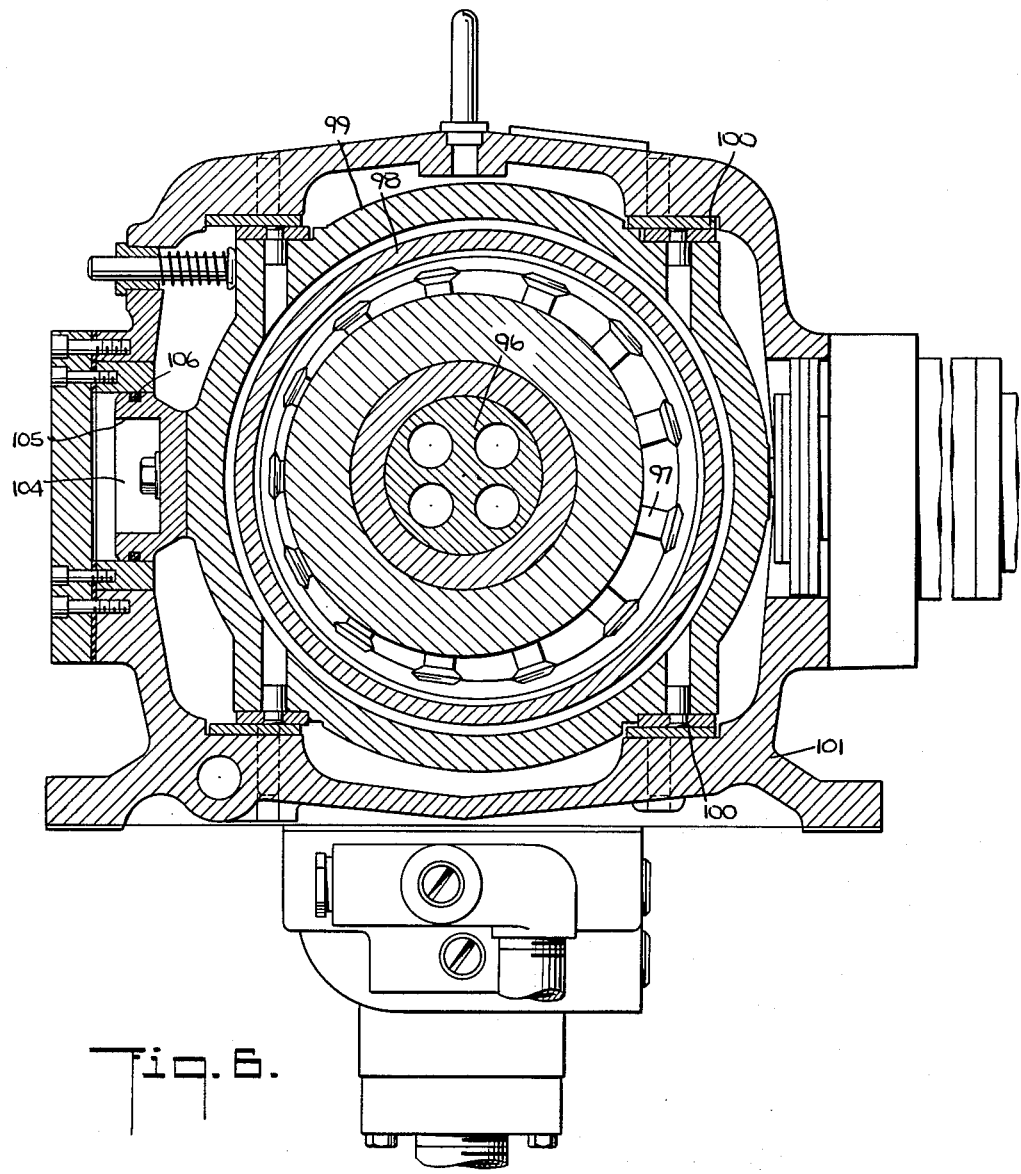
FIGURE 6 is a drawing of the reversible variable displacement pumps of the pneumatic pump control system of FIGURE 5.

Referring to FIGURE 6, a reversible variable displacement pump is shown in cross section with pintle 96, pistons 97, rotor 98 and the slide block 99 which rides on slides 100 as its position with respect to the pump housing 101 and thereby with respect to the pintle 96 and pistons 97 is adjusted to vary the stroke and the direction of pump output.

Referring to FIGURES 6 and 7, the pump control means for moving the slide block comprises, on the right hand side as shown, a control piston 102 and cylinder space 103. Pressure in the cylinder 103 tends to move the slide block to the left. When pressure is reduced in that space, the gear pump pressure supplied to cylinder 104 and piston 105 shifts the slide bar to the right. Pistons 102 and 105 are mechanically joined to the slide block and each carries rings 106. The oil pressure in cylinder 103 is also supplied by the gear pump. It is regulated by valve spool or internal piston 107 which runs in sleeve or cylinder 108. In operation, the gear pump supplies oil through passageways to the right hand portion 107a of the valve spool which, when it is moved to the left, by means described below, admits a small portion through passageway 109 into the cylinder 103. This causes the slide block 99 to move to the left, as the larger piston 102 overpowers the small piston 105 although both are supplied with the same pressure from the gear pump. The slide block's leftward movement moves the sleeve 108 to the left until the port of passageway 109 through the sleeve 108 is again aligned with the valve spool to stop the supply of oil. When the valve spool is moved to the right, the oil in its cylinder 103 is vented to the reservoir through passageway 109 past the left hand side 107b of the valve spool. As the slide block and the connected sleeve 108 moves to the right, the port opened by the initial movement of internal spool 107 is closed and the equilibrium is again re-established. Thus it is clear that relatively small power input to the valve spool 107 will cause it to shift in position and control the slide block 99 and consequently the delivery of the pump.

The pneumatic pump control means operate the valve spool in the following manner. Signal pressure is supplied to the left hand side of cylinder 110 and piston 111 which carries rings 112. As this signal pressure is increased, the piston 111 moves to the right against the restraining force of a linearly responsive spring 113. The piston 111 carries with it the valve spool 107 by an extension thereon 114. The range of signal pressure required to move the internal piston through its full range from causing maximum output at one port to causing maximum output at the other port, is determined by the compressibility of linear spring 113. As an additional modification, a regulated pressure may also be supplied through regulator 46a and line 46b to the right hand side of the cylinder 110 to counterbalance the signal pressure, for example, so as to accommodate variations in signal pressure above a threshold. If this supplemental air supply is not maintained at uniform pressure but is entrained in the piston 110 and compressed during the rightward movement of piston 111, it supplements the action of spring 113.

According to this invention and the pump control means, the delivery of the variable displacement pumps (normally operated at constant speed) can be accurately regulated by a simple air cylinder with a mechanical spring return, so as to provide convenient remote control during the extrusion stroke of the press.

Valve 48 connects lines 37 and 44 in its returned right hand position and caps line 35. In its actuated and left hand position the valve caps line 37 and connects lines 35 and 44. Line 44 is connected to pneumatic pump control means 45 through means described above and also connects to a computer 49, as explained below.

It would be possible to valve the signal pressure of line 44 directly to the pump control means 45 and 56 of pumps 2 and 1, respectively, to provide direct manual regulation of the pumps output and the operation of the hydraulic piston or pistons they power. This would, however, result in varying ram speeds for the same signal pressure depending on the operating hydraulic pressure generated and the consequent slippage in the system.

The pneumatic control system facilitates, and it is a part of this invention to provide automatically adjusting compensation systems to adjust the pneumatic signal pressure to compensate for the increasing slippage including internal leakage of the pump and system with increasing operating pressures. As these pressures are measured in thousands of pounds per square inch, the slippage normally caused can be significant. Such a system has important operational advantages. For example, the pressure gauges 35a and 37a or even the manually controlled regulators 34 and 36 may be calibrated in inches per minute of ram speed and this calibration will remain accurate throughout the extrusion stroke and be independent of the oil pressures which are generated during that stroke. Thus an operator can set the desired speed by simply adjusting the air pressure regulator 36 with reference to the reading of pressure gauge 37a and the machine will automatically maintain the speed or incorporate it as a part of an automatic cycle. With any known die, this calibration may also be in feet per minute of extrusion speed, to facilitate setting the extrusion speed to the maximum consistent with good extrusion surface quality or to facilitate matching the output of this press to subsequent storing or manufacturing operations.

The compensation system of the present invention comprises a computer 49 and a pressure transducer 50. Both are supplied with clean dry regulated air through line 31. During the extrusion stroke, fluid is supplied to the ram through line 6 and the transducer senses the output pressure in line 6 past cut-off valve 51 and through line 52.

The transducer 50 applies the computer with an air pressure signal of manageable magnitude which varies in the proportion to the variation of pressure in the output line 6, for the air signal control system operates at relatively low pressure for example within the range from about 0 to 20 p.s.i. The compensation is referred to as an increase in signal pressure to accomplish the needed additional output because the pumps are connected so that full signal pressure produces maximum output at port "b". Alternatively, the system could be arranged so that compensation is made in the output of the pump at port "a," for which a minimum of signal pressure produces full output.

The transducer (FIG. 8) includes a measuring element 116 connected through linkages 117 and 118 to vary the position of a flapper 119 against a nozzle 120, which it throttles according to its position. A bellows 121 is connected to output line 122 and moves the flapper with respect to the nozzle according to the output pressure. The nozzle is supplied through line 123 from supply line 31 through a conventional reducing tube 125. Pressure in line 123 is a function, therefore, of the throttling position of the flapper. This pressure acts through diaphragm 126 to supply the output line 122 with the desired pressure.

It can be seen that the output will be proportional to the pressure sensed by the measuring element because increases in sensed pressure in line 52 cause the measuring element and linkages 117 and 118 to move the flapper 119 closer to the nozzle which causes a build up of pressure in line 123. This pressure causes the relay 127 to supply more air to the output line 122 until the output pressure itself has built up to the point where its bellows 121 expand sufficiently to restore the flapper to its original throttling position with respect to the nozzle.

The relay itself is constructed as shown with housing 128 which may be made in several sections to facilitate assembly and later fastened together. It contains passageways 129 for line 123, 130 for supply line 31 and 131 for output line 122. The nozzle line feeds chamber 132 behind diaphragm 126 which is connected to a ball and stem assembly 133. This assembly operates against cantilever springs 134 which can be set through a tension adjusting screw 135. The diaphragm 126 opens the passageway 136 between the supply and output lines in response to increases in pressure in chamber 132.

The proportional computer 49 (FIG. 9) supplies an output signal to line 53 which equals the signal pressure supplied through line 44 plus an amount proportional to the increase in output pressure of line 6. The increase could be supplied to the control means of both pumps or it may be supplied to the control means of one pump, which supplies compensation for both, as is described in this embodiment. The computer includes output line 53, computer input line 122, which is also the transducers output line 122, signal input line 44 and a constant input line 138. The lines are connected to bellows 53b, 138b, 44b and 122b.

Supply pressure is connected through line 31.

In operation, the combined forces exerted by the bellows 53b, 138b, 44b and 122b balance a floating disc 139 against the fulcrums 140. This floating disc or flapper valve 139 acts to throttle nozzle 141 which is held in position by the frame of the computer.

The relay 142 is constructed similarly to relay 127, described in detail as a part of the transducer pneumatic circuit. The reducing tube 143 is similar to the reducing tube 125.

Flapper valve 139 acts to regulate the output pressure in line 53 so that it will be equal to the pressure in line 44, the signal pressure from the controllers or pressure regulators that are described elsewhere; plus the difference between pressure in line 122 less the pressure in line 138. This proportion can be adjusted by rotating the fulcrums about axis 144 so that at one extreme if the fulcrums are placed more or less over the bellows 122b and 138b the pressure differential will have no effect and so that, at the other extreme, if the fulcrums are placed almost over bellows 53b and 44b, the pressure differential will have an infinite effect. The pressure to line 138 may be supplied at a constant pressure by a conventional regulator 138a. Alternatively, the bellows 138b may be replaced with a spring to exert a constant force on the flapper ring 139. The pressure from either the regulator-bellows combination, or from a spring is selected at roughly the threshold of the normal extrusion pressure for the press as reduced by the transducer 50 so that the compensation can be proportional to the slippage that occurs within the working range of pressure. Slippage, to the extent that it is present below that range of pressure (and therefore before extrusion begins) is unimportant.

Moreover, it has been found that slippage in a variable delivery pump powered metal extrusion press typically has an approximately direct linear relation to output pressure within the working range of about 50% to 100% of pressure capacity, while it is typically non-linear below that range or when considering the entire pressure range. Hence, it has been found that a relatively simple constant ratio proportioning computer can be used to give accurate compensation if adjusted with respect to the average slippage-pressure ratio within the working pressure range and without reference to low pressure slippage.

Stability is achieved and is maintained for, as the pressure of input line 122 drops, bellows 122b relax and the floating flapper valve moves slightly away from the nozzle 141. This causes a drop in pressure in line 145. With reduced pressure in line 145, the relay reduces the supply through the output line 137 until bellows 137b has sufficiently relaxed to allow the flapper valve to return to its initial position. It will be understood that, since the system is essentially always in equilibrium, the actual physical movements of the flapper valve are very small, any movement immediately occasioning the correction to restore it to its original position.

Two way solenoid actuated spring returned valve 54 connects line 41 to line 55 in its returned left hand position and caps line 53. In its actuated or right hand position, the valve connects compensated signal pressure line 53 and line 55 and caps line 41. The compensation is made sufficient to compensate for slippage in both pumps and the leakage in the system. The adjustment, as explained above, may be made or corrected in the field to take into account the variations that are experienced under actual operating conditions. As also explained above, valve 42 connects the uncompensated signal pressure from line 44 to line 43 and the control means of pump 2.

Line 55 supplies the pneumatic control means 56 of the reversible variable displacement pump 1 with signal air pressure. Supplemental air pressure is supplied through line 46.

*Electrical control circuit*

Figure 10B:
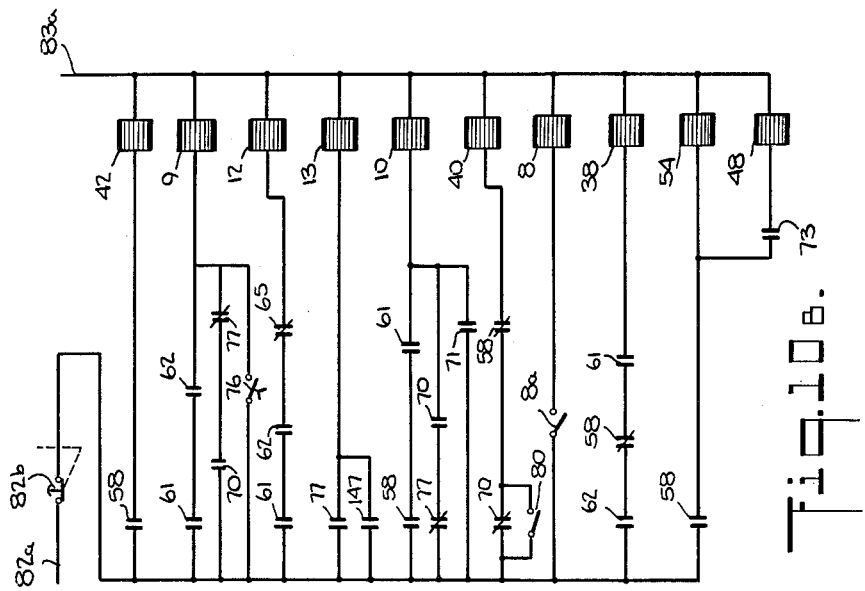
FIGURES 10a and 10b are schematic drawings of the electrical and limit switch signal and power control system for the pneumatic pump control system of FIGURE 5.
Figure 10A:
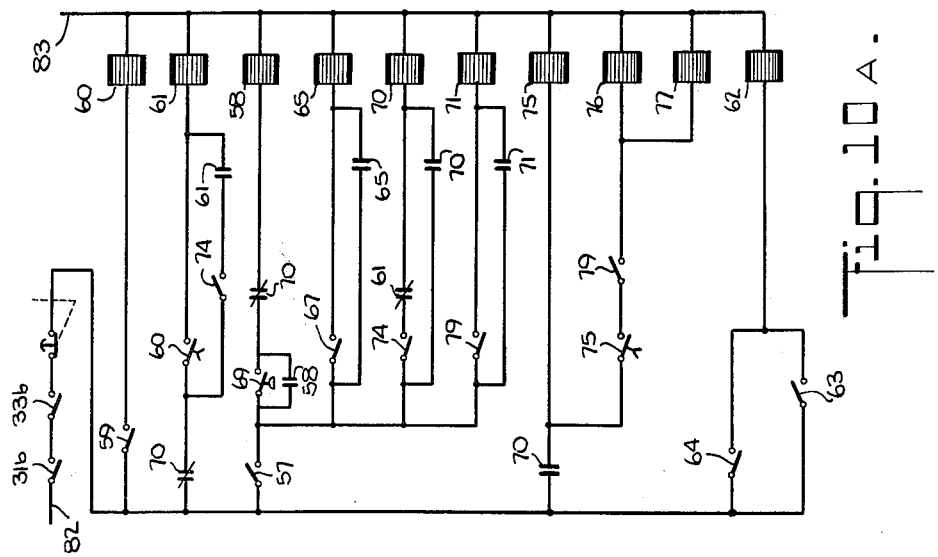

The electrical control circuit is supplied with signal power through lines 82 and 83 (FIG. 10a) through the normally open contacts of pressure switch safety interlocks 31b and 33b and a start-stop switch.

Relay 60 is connected between these lines in series with the normally open contact of limit switch 59.

Relay 61 is connected in series with a normally closed contact of relay 70 and a normally open and time delay contact of relay 60. A holding circuit is in parallel with contact 60 and comprises a normally closed contact of limit switch 74 and a normally open contact of the relay 61.

Relay 58 is connected in series with a normally closed contact of limit switch 57; a normally open time delay contact of pressure switch 69 in parallel with a holding circuit comprising normally open contact of relay 58; and a normally closed contact of relay 70.

Relay 65 is connected in series with a normally closed contact of limit switch 57 and a normally open contact of limit switch 67, in parallel with a holding circuit comprising normally open contacts of relay 65.

Relay 70 is connected in series with a normally closed contact of limit switch 57, a normally open contact of limit switch 74, and a normally closed contact of relay 61, the latter two contacts being in parallel with a holding circuit comprising normally open contact of relay 70.

Relay 71 is connected in series with a normally closed contact of limit switch 57, a normally open contact of limit switch 79, the latter in parallel with a holding circuit comprising a normally open contact of relay 71.

Relay 75 is connected in series with normally open contact of relay 70.

Relay 76 is connected in series with a normally open contact of relay 70, a normally open time delay contact of relay 75, and a normally closed contact of limit switch 79.

Relay 77 is connected in parallel with relay 76.

Relay 62 is connected in series with a normally open contact of limit switch 64 which is in parallel with a normally closed contact of limit switch 63.

Operating power for the solenoids controlling and operating the valves is supplied through lines 82a and 83a (FIG. 10b) through an emergency stop switch 82b.

Solenoid 42, associated with valve 42 is connected in series with a normally open contact of relay 58.

Solenoid 9 is connected in series with a normally open contact of relay 61 and a normally open contact of relay 62. These are in parallel with a normally open contact of relay 70 and a normally closed contact of relay 77 and also in parallel with a normally open time delay contact of relay 76.

Solenoid 12 is in series with normally open contacts of relays 61 and 62, and a normally closed contact of relay 65.

Solenoid 13 is in series with a normally open contact of relay 77 which is in parallel with normally open contacts 147.

Solenoid 10 is in series with a normally open contact of relay 58 and a normally open contact of relay 61, which are in parallel with a normally closed contact of relay 77 and a normally open contact of relay 70 and also in parallel with a normally open contact of relay 71.

Solenoid 40 is in series with a normally closed contact of relay 70, which is in parallel with a normally open contact of limit switch 80; and all in series with a normally closed contact of relay 58.

Solenoid 8 is in series with normally open contacts 8a.

Solenoid 38 is in series with a normally open contact of relay 62, a normally closed contact of relay 58 and normally open contact of relay 61.

Solenoid 54 is in series with a normally open contact of relay 58.

Solenoid 48 is connected in parallel with solenoid 54 in series with a normally open contact 73.

Operation

A means of sensing the position of the ram includes limit switches which electrically operate the relays which control the pilot valves of the hydraulically pilot operated hydraulic valves and directly operate the valves of the pneumatic control system. As this limit switch, relay and solenoid system is explained in connection with the operating cycle of the main ram, reference will be made to the operation of the other parts of an extrusion press which may be controlled conventionally, either manually or automatically, or by use of the invention of this disclosure.

At the start it will be assumed that control power is being supplied through lines 82 and 83, that the stop-start switch has just been closed and that the pressure switches 31b and 33b are held closed as they sense the proper operating air signal pressure in lines 31 and 33 respectively, the ram is fully retracted actuating limit switch 57, that hydraulic valves 8, 9, 10, 12 and 13 are all in their returned positions and that pneumatic valves 38, 42, 48 and 54 are all in their spring returned positions while valve 40 is actuated by its associated solenoid.

The next forward movement of the main ram is occasioned as the billet loader moves into position and there actuates limit switch 59 causing hydraulic valves 9 and 12 and air valve 38 to shift.

A normally open contact of switch 59 closes to energize time delay relay 60. When this relay has timed out, its normally open contacts close to complete the circuit through a normally closed contact of relay 70 which is closed (as limit switch 57 is actuated) to energize relay 61. Normally open contacts of relay 61 close to hold it in past timer 60 and to energize the solenoid controlling valve 9 by completing a circuit through a normally open contact of relay 62. (Relay 62 is energized and this contact closed through a normally closed contact of limit switch 63, which remains closed until the switch is actuated by the rams forward movement past point where it would interfere with the billet loader.)

Another normally open contact of relay 61 closes to energize the circuit to the solenoid controlling the pilot valve of the hydraulically actuated valve 12 through a normally open contact of relay 62, which is closed as explained before, and a normally closed contact of relay 65, which closed when relay 65 was opened by limit switch 57 at the conclusion of the ram's last retraction.

The solenoid valve 38 is energized through another normally open contact of relay 61, another normally open contact of relay 62 and a normally closed contact of relay 58 which closed when switch 57 opened.

As a consequence of the above described operation, valve 38 is energized, shifts to its right hand position and supplies high signal air pressure from regulator 28, through line 31, valve 38, line 39, valve 40, line 41, valves 42 and 54, lines 43 and 55 to the pump control means 45 and 56 of the reversible variable displacement pumps 2 and 1, respectively, which causes the pump to give full output from port "b".

The delivery of the pump is not instantaneous, but rather builds up as the pressure in the pneumatic line builds up to provide smooth acceleration. The time of the build up or gradual switching depends on the volume of air contained in the pneumatic circuit and on the rate of supply. It may be conveniently controlled in the field to provide the fastest possible cycling compatible with smooth operation under actual working conditions by valve 31c. Similar control may be exercised on other sources of signal pressure to regulate other shifting operations and to adjust the rates of acceleration and deceleration which they provide. By way of another example, the source of signal pressure provided by venting to the atmosphere may be controlled by valve 39a so that this signal pressure can be adjustably supplied to cause the pumps to smoothly shift from supplying full output for extrusion to supplying full output for ram retraction, and thus smoothly handle both the decompression that occurs at the end of the extrusion stroke and the high inertia of the ram assembly.

According to the invention of a pneumatic pump control system for cycling an extrusion press, one may also conveniently include additional air pressure regulators to provide signal pressure to cause the pump to deliver at half output, or any other rate of output. Such regulators may be connected to the pump control means through the same circuit to provide even more precise and gradual control of acceleration and deceleration to safely handle high operating speeds. These additional pneumatic signal sources are not illustrated as their use will be apparent in view of full disclosure of the basic pneumatic circuit and its principle of operation.

With the controlling solenoids of hydraulic valves 9 and 12 energized, and the valves actuated, the pumps are caused to deliver full output through their ports "b" through line 6, valve 13 and line 14 to the rear portion of the side of positioning cylinders 23.

At the same time, pressure is transmitted through valve 12 and line 11 to the control cylinder on the prefill valve 21 to maintain it open.

The side cylinders force the ram forward at a rapid speed, the ram cylinder 19 fills from the reservoir 7 through line 22 and prefill valve 21, and the fluid displaced ahead of the pistons 24 in the cylinders 23 is recirculated through valve 12 to the rear of the same cylinders and the other sides of the same pistons through line 11, line 6, valve 13 and line 14. This effectively increases the delivery of the pumps by the amount of fluid displaced from ahead of the piston 24 which provides for a more rapid advance than would otherwise be possible and conserves the use of high pressure fluid.

The main ram moves forward, pushes the billet off the billet loader and into the container and actuates limit switch 66. This causes the billet loader to retract by means that may be conventional. The ram continues its forward movement to engage limit switch 63, opening its normally closed contact. This delays it if, and only if, the billet loader has not retacted to engage limit switch 64 and close its normally open contact in parallel with the normally closed contact of switch 63; otherwise, relay 62 is de-energized, its normally open contacts to open and de-energize the solenoid controlling hydraulic valve 9, which allows the pumps to simply recirculate their output, and it also de-energizes the solenoid controlling hydraulic valve 12 which stops the differential action of the positioning or side cylinders of the ram, and de-energizes pneumatic control valve 38 which throws the pumps into idle or zero output. The main ram continues forward to actuate the limit switch 67 which causes it to be slowed to its pre-extrusion speed in the following manner. Limit switch 67 energizes relay 65 which is then held by the closing of a normally open contact in parallel with limit switch 67 until, when the ram has completed its retraction, limit switch 57 is actuated and its normally closed contact opened. A normally closed contact of relay 65 opens to de-energize the solenoid controlling hydraulic valve 12. That valve is spring returned to separate line 6 from line 11.

The effective delivery to the side cylinders 23 becomes the output of the pumps and the ram continues to move forward under a back pressure which may be adjusted through the relief valve 68 which is connected to the reservoir 7. This back pressure serves to slow the extremely heavy ram and its associated crosshead, connecting rods and pistons.

When the extrusion plunger of the ram upsets the billet, pressure gradually builds up in the pump output and line 6, the pre-fill valve is actuated so that the reservoir is disconnected and the pump supplies hydraulic fluid under pressure to that cylinder. This actuates pressure switch 69 which activates the extrusion control system. The normally open contact of pressure switch 69 is connected in series with a normally closed contact of limit switch 57, a normally closed contact of relay 70, which is closed as will be described below so that relay 58 is energized.

A normally open contact of relay 58 closes to energize the solenoid operating pneumatic control valve 42, and another normally open contact of relay 58 closes to energize the solenoid operating pneumatic control valve 54.

Another normally open contact of relay 58 closes to energize the solenoid controlling the pilot pressure to the hydraulic valve 10 through a normally open contact of relay 61 which is now closed.

The solenoid operating pneumatic valve 40 is deenergized as a normally closed contact of relay 58 opens. Likewise, the solenoid controlling pneumatic control valve 38 is de-energized as another normally closed contact of relay 58 opens, which only serves to put the pump in neutral should valves 40, 42 and 54 all fail to shift.

If desired the controls in the auxiliary pulpit may be actuated at this time by closing the contacts at 73 to actuate the solenoid operating pneumatic control valve 48.

With pneumatic control valve 54 and 42 actuated, an pneumatic control valves 38, 48, and 40 unactuated, air signal pressure is supplied from regulator 36 through line 37, valve 48, line 44, valve 42, line 43 to pump control means 45 and, through the same line 37, valve 48, line 44, into the compensation system from whence it is supplied through line 53, valve 54, line 55 to pump control means 56. Alternatively, if the auxiliary pulpit is actuated, the operator may exercise control by a regulator 34, line 35 to the valve 48. In either event the signal air pressure to the pump control means is continuously variable, it may be directly observed from a gauge that may also be calibrated to show ram speed, and for a given die the extrusion speed itself, since the slip compensation system will automatically adjust the signal pressure to maintain constant pump delivery and thus ram speed despite variations of back pressure within the working pressure range.

In this embodiment, pumps 1 and 2 are made of approximately the same physical characteristics and consequently a slip compensation can be provided for both pumps by approximately doubling the compensation supplied to the control system of one pump and causing their outputs to be delivered through a common line. The pumps may be quite different sizes and an appropriate proportional increase supplied to one pump control preferably that of the larger pump.

The output of the pumps is through their port "b" and line 6 to the main ram cylinder 19 and also through valve 13 and line 14 to the auxiliary cylinders which may assist during the extrusion stroke. Alternatively, valve 13 may be actuated and the entire pump delivery supplied through line 6 to the main ram which decreases the working force slightly but increases the maximum extrusion speed in about the same proportion. The actuation of valve 13 may be through contact 147, and in this case the cylinders 23 are filled from the reservoir 7 past check valve 17 and through line 14.

The return from the cylinders 23 is through line 11, valve 10, line 5 and valve 8 and line 4.

The ram advances under the control of the operator's manual operation of the signal pressure regulator 36 or 34. The slip compensation maintains a uniform ram speed for any regulator output. The extrustion truly is, of course, the heart of the operation, and, as it is the proportion of the stroke performed at the high operating pressure, it occupies the major portion of the entire cycle.

At the end of its extrusion stroke, the ram actuates limit switch 74. A normally closed contact of limit switch 74 opens to open the holding circuit to relay 61, the energizing circuit having already been opened by timer contact of relay 60, de-energized and open when the billet loader retracted releasing the normally open contact of limit switch 59. A normally open contact of limit switch 74 closes to actuate relay 70, through a normally closed contact of relay 61, now closed, and the relay is held in by a normally open contact in parallel with the contacts of limit switch 74 and relay 61, until limit switch 57 is actuated at the conclusion of the cycle as explained above.

Actuation of relay 70 opens its normally closed contacts to de-actuate relay 58 which de-energizes solenoid operating valves 42 and 54. A normally open contact of relay 70 is closed to energize relay 75. Other normally open contacts of relay 70 close to continue power to the solenoid controlling valves 9 and 10. A normally closed contact of relay 70 opens to break the circuit to the solenoid controlling valve 40.

The pump control means 56, 45 of the pumps 1 and 2, respectively, are vented to zero air pressure through lines 55 and 43, valves 54 and 42, line 41 and valve 40. They deliver full flow through their ports "a" and lines 4 and 5, valve 8, valve 10, line 11, to the forward side of the positioning cylinders 23. At the same time, the prefill valve is actuated through pressure in line 11 to allow the ram to discharge oil through line 22 into the reservoir 7. The positioning cylinders discharge fluid through line 14, valve 13 and line 6 back to the pumps. The drop of pressure in the main ram cylinder causes the pressure switch 69 to reset.

The main ram retracts until in position for stripping and then stops and locks up (while the container moves off the die to strip out the butt end left after the billet extrusion). This is accomplished when timer relay 75 times out and its normally open contact closes to actuate relays 76 and 77 through normally closed contact of limit switch 79 that is closed when the container is towards the die, as it is at the end of the extrusion stroke.

Relay 77 is instantaneous and its normally open contact closes to energize the solenoid controlling hydraulic directional valve 13 which shifts to its actuated position and a normally closed contact of relay 77 opens to de-energize the solenoid controlling hydraulic directional valve 10 which shifts to its return position.

The solenoid controlling hydraulic directional valve 9 is de-energized momentarily too as a normally closed contact of relay 77 opens, momentarily by-passes pump delivery.

After the valves 10 and 13 have had a chance to shift, blocking lines 5 and 6 respectively and thus locking the ram for the stripping operation, relay 76 times out and a normally open contact closes to energize the solenoid controlling valve 9 which shifts to its actuated left hand position. The pumps 1 and 2 thus supply power to the feed lines 4 and 5 to power the movement of the container off the die and past the locked ram through circuits which are not shown but which will be apparent to those skilled in this art in view of this disclosure.

The locking up of the main ram for stripping is described just above by means of the hydraulic valves and without use of the pneumatic control system to illustrate how, on a relatively small press, this may be resorted to as an economy. This is sometimes feasible since the reaction occurs at fairly low pressure and involves only the small volume of the side or positioning cylinders, which act somewhat like dash pots. Moreover the pump delivery can not only be momentarily by-passed but it can be valved to the container to prevent any interruption of pump flow or resultant pressure peaks. Provision can also be made for closing valve 13 slowly. On relatively large presses, and in keeping with the teaching of this invention, the pneumatic pump control system should be used to shift the pump to neutral and provide a control ram assembly deceleration before shifting the hydraulic valves 10 and 13 to provide a positive lock-up.

When the container has retracted, limit switch 79 is actuated and a normally closed contact closes to energize relay 71, which is held in by a normally open contact past the limit switch. Normally open contacts of this relay in turn close to energize the relay controlling hydraulic valve 10, which actuates to connect lines 5 and 11.

A normally closed contact of limit switch 70 opens to de-energize relay 77, which in turn opens to de-energize solenoid 13 which allows the associated valve to spring return connecting lines 6 and 14.

The pneumatic control valves remain as before and the pumps again act to power the retraction of the main ram.

When the ram has retracted sufficiently, a shear interlock (not shown) is released. The shear may be operated while the ram continues to return. If desired, one of the two pumps can be used for this purpose while the other continues to power the retraction of the main ram, by actuation of valve 8.

The main ram continues to retract until limit switch 80 is actuated which puts the pumps into neutral so that the ram slows as its movement continues with inertia.

The limit switch 80 when actuated closes its normally open contact and energizes the solenoid operating pneumatic control valve 40 (through the normally closed contact of relay 58) which shifts to its right-hand position to connect signal air at idling pressure from regulator 32 and line 33, valve 38 and line 39 to the pump control means 45 and 56 through line 41, valves 42 and 54, lines 43 and 55.

When the main ram hits limit switch 57, its movement is positively stopped.

Normally closed contact relay 57 opens to de-energize relay 65, relay 70 and relay 71. This in turn de-energizes the solenoid controlling hydraulic directional valves 10 which spring returns to block pump delivery through lines 5 and 11 to the positioning cylinders 23 and the main ram halts.

In this condition, the ram is ready for recycling.

It is understood that conventional interlock or hydraulic extrusion pressures may be used to time the operations of the stub shear, the container, the die slide and the billet loader.

The simplicity of a pneumatic control system with its conventional copper tubing is that the signal air pressure may be supplied to the pump control means by means of dependable air regulators. It may be sensed at any time and when it deviates from the desired operating condition, the output of the pumps may be immediately by-passed from the operating circuit, either manually or by pressure interlock switches. Moreover, the possibility of malfunction, and particularly a discontinuous malfunction such as is caused by the common electrical short circuit, is very much reduced. As a consequence, wild, uncontrolled press movements are virtually impossible. For example, even in the unlikely event that the copper tubing conveying the pump controlling signal pressure should be damaged, it does not fail all at once and without warning, but rather tends to develop a slow leak, which can be both heard and also sensed as the system supplies more air in compensation for that lost. Even if the pressure should go beyond limits, it goes slowly.

While the invention has been described with particular reference to the main ram, it will be apparent to men skilled in the art that it may be similarly applied to other hydraulic cylinders, including, for example those operating the die slide, billet loader, shear and container of an extrusion press.

I claim:

1. In an extrusion press, a pneumatic control system for a reversible variable delivery pump having a pneumatic pump control means for reversing and varying its output in proportion to a pneumatic control signal pressure, said control system having more than one source of pneumatic signal pressure; valving and tubing means for connecting each of said pneumatic signal sources separately to said pump control means through an elastic medium and valve control means whereby said pneumatic signal sources may be alternatively connected through said elastic medium to said pump control means to control the pump output.

2. In an extrusion press, a pneumatic control system for a variable delivery pump having a pneumatic pump control means for varying its output in proportion to a pneumatic control signal pressure, said control system having more than one source of pneumatic signal pressure at least one of which is preset at a fixed value; valving and air filled tubing means for connecting each of said signal sources separately to said pump control means through an air elastic medium and valve control means whereby said pneumatic signal sources may be alternatively connected through said elastic medium to said pump control means to control the pump output.

3. In an extrusion press, a pneumatic control system for a variable delivery pump having a pneumatic pump control means for infinitely varying its output within its operating range in proportion to an infinitely variable pneumatic control signal pressure, said control system having more than one source of pneumatic signal pressure at least one of which is variable under manual control during the operation of said pump; valving and air filled means for connecting each of said signal sources separately to said pump control means through an air elastic medium and valve control means whereby said pneumatic signal sources may be alternatively connected through said elastic medium to said pump control means to control the pump output.

4. In an extrusion press, a pneumatic control system for a hydraulic cylinder and piston including at least one reversible variable displacement pump having pneumatic pump control means for reversing and varying the output of said pump in proportion to a pneumatic signal control pressure, means interconnecting said pump with said hydraulic cylinder, said control system having more than one source of pneumatic signal pressure; valving and air filled tubing means for connecting each of said signal sources separately to said pump control system through an elastic air medium, and valve control means for selecting the connection of each of said pneumatic signal sources to said pump control means whereby said hydraulic cylinder may be controlled through said elastic medium according to said sources of pneumatic signal pressure.

5. In an extrusion press, the pneumatic control system of claim 4 in which said valve control means includes limit switches which sense the position of said piston so that said valves are controlled, said sources of signal pressure connected and said pump operated in response to the movement of said piston.

6. In an extrusion press, a pneumatic control system for a hydraulic cylinder and piston including at least one reversible variable displacement pump having pneumatic pump control means for reversing and varying the output of said pump in proportion to a pneumatic signal control pressure, means interconnecting said pump with said hydraulic cylinder, said control system having more than one source of pneumatic signal pressure at least one of which is preset at a fixed value; valving and air filled tubing means for connecting each of said signal sources separately to said pump control system through the tubing contained elastic air medium, and valve control means for selecting the connection of each of said pneumatic signal sources to said pump control means through said elastic medium whereby said hydraulic cylinder may be controlled according to said sources including said preset source of pneumatic signal pressure.

7. In an extrusion press, a pneumatic control system for a hydraulic cylinder and piston constituting a hydraulic motor including at least one variable delivery pump having pneumatic pump control means for infinitely varying the output of said pump through an air elastic medium, means interconnecting said pump with said hydraulic motor, said control system having more than one source of pneumatic signal pressure at least one of which is manually variable during the operation of the hydraulic motor; valving and air filled tubing means for connecting each of said signal sources separately to said pump control system through an air elastic medium, and valve control means for selecting the connection of each of said pneumatic signal sources to said pump control means through said elastic medium whereby said hydraulic motor may be controlled according to said sources including said manually variable source of pneumatic signal pressure.

8. An extrusion press including a ram cylinder, a ram, at least one variable delivery pump having pneumatic pump control means for varying the output of said pump in proportion to a pneumatic signal control pressure, means interconnecting said pump with said ram cylinder, a pneumatic control system including more than one source of pneumatic signal pressure, tubing means for connecting each of said pneumatic signal sources separately to said pump control means through an elastic medium, valving and valve control means whereby said pneumatic signal sources, and tubing means may be selected for connection to said pump control means so that the action of said ram may be controlled in proportion to said sources of pneumatic signal pressure.

9. In an extrusion press including a ram cylinder, a ram, at least one reversible variable delivery pump having pneumatic pump control means for reversing and varying the output of said pump in proportion to a pneumatic pressure signal and means interconnecting said pump with said ram cylinder; a pneumatic control system including more than one source of pneumatic signal pressure at least one of which is preset at a fixed value, valving and air filled tubing means for connecting each of said pneumatic signal sources separately to said pump control means through an elastic medium and valve control means whereby said pneumatic signal sources may be connected to said pump control means through said elastic medium and the action of said ram may be controlled in proportion to said sources, including said preset source of pneumatic signal pressure.

10. In an extrusion press including a ram cylinder, a ram, at least one reversible variable delivery pump having pneumatic pump control means for reversing and varying the output of said pump and means interconnecting said pump with said ram cylinder; a pneumatic pressure control system including more than one source of pneumatic signal pressure at least one of which is manually variable during the operation of said ram, air filled tubing, means for connecting each of said pneumatic signal pressure sources separately to said pump control means, valving and valve control means whereby said pneumatic signal pressure sources may be selectively connected to said pump control means and the action of said ram may be controlled in proportion to the pressures of said sources, including said manually variable source of pneumatic signal pressure.

11. An extrusion press including a ram cylinder, a ram, at least one variable delivery pump having pneumatic pump control means for varying the displacement of said pump, a pneumatic control system including more than one source of pneumatic signal pressure, at least one of which is preset and at least one of which is manually variable, a compensation system for at least one of said sources of signal pressure, said compensation system adjusting said pressure in response to changes in the output pressure of said pump within its operating range, valving means for connecting and disconnecting each of said sources of pneumatic signal pressure separately to said pump control means whereby the action of said ram may be controlled according to said sources of pneumatic signal pressure.

12. The extrusion press of claim 11 in which said valve control means includes limit and pressure switches which sense the position and operating pressure of said ram so that said valves are controlled, said sources of signal pressure connected and said ram operated in response to the movement and operating pressure of said ram.

13. The extrusion press of claim 11 in which said valve control means includes limit and pressure switches which sense the position and operating pressure of said ram so that said valves are automatically controlled, said sources of signal pressure automatically connected and said ram automatically operated in response to the movement and operating pressure of said ram.

14. An extrusion press including a ram cylinder, a ram, at least one reversible variable delivery pump having pneumatic pump control means for reversing and varying the displacement of said pump, a pneumatic control system including more than one source of pneumatic signal pressure, at least one of which is preset and at least one of which is manually variable, a compensation system for at least one of said sources of signal pressure, said compensation system adjusting said pressure in response and in substantially linear proportion to changes in the output pressure of said pump within its operating range, valving means for connecting and disconnecting each of said sources of pneumatic signal pressure separately to said pump control means, whereby the action of said ram may be controlled according to said sources of pneumatic signal pressure.

15. A metal extrusion press including a ram cylinder, a ram, at least one reversible variable delivery pump having pneumatic pump control means for reversing and varying the displacement of said pump, a pneumatic control system including more than one source of pneumatic signal pressure, at least one of which is preset and at least one of which is manually variable, a compensation system for said manually variable source of signal pressure, said compensation system including a transducer and computor for adjusting said pressure in response to changes in the output pressure of said pump within its operating range for metal extrusion, valving means for connecting and disconnecting each of said sources of pneumatic signal pressure separately to said pump control means whereby the action of said ram may be controlled according to said sources including said manually variable and compensation source of pneumatic signal pressure.

16. A metal extrusion press including a ram cylinder, a ram, at least one reversible variable delivery pump having pneumatic pump control means for reversing and varying the displacement of said pump, a pneumatic control system including more than one source of pneumatic signal pressure, at least one of which is preset and at least one of which is manually variable, a compensation system for said manually variable source of signal pressure, said compensation system including a transducer and computor for adjusting said pressure in response to changes in the output pressure of said pump within its operating range for metal extrusion, valving means for connecting and disconnecting each of said sources of pneumatic signal pressure separately to said pump control means, valve control means for sensing the position and operating condition of said ram and automatically controlling said valving means to connect and disconnect said sources of pneumatic signal pressure from said pump control means in response thereto whereby the action of said ram may be controlled according to said sources including said manually variable and compensation source of pneumatic signal pressure so as to automatically cyle and operate said ram throughout the extrusion press operation.

17. A metal extrusion press including a ram cylinder, a ram, a billet loader and operating cylinder, a container and operating cylinder, a shear and operating cylinder, at least one variable delivery pump having pneumatic pump control means for varying the displacement of said pump, a pneumatic control system including more than one source of pneumatic signal pressure, at least one of which is preset and at least one of which is manually variable, a compensation system for said manually variable source of signal pressure, said compensation system adjusting said pressure in response to rises in the output pressure of said pump within its operating range, valving means for connectiing and disconnecting each of said sources of pneumatic signal pressure separately to said pump control means, valve control means for sensing the position and operating condition of said ram, billet loader and container and automatically controlling said valving means to connect and disconnect said sources of pneumatic signal pressure from said pump control means in response thereto whereby the action of said ram may be controlled according to said sources of pneumatic signal pressure so as to automatically cycle and operate said ram throughout the extrusion press operation.

18. An infinitely variable pneumatic pressure control system for an extrusion press including a ram cylinder, a ram, a variable displacement constant speed pump provided with a spring-return pump control means for varying the displacement and thereby the delivery of the said pump, said pump control means being adapted to receive and be operated by a pneumatic signal pressure, and hydraulic conduit means interconnecting said pump with said ram cylinder; said pressure control system including at least one source of supply for pneumatic signal pressure at a preset and fixed value, at least one source of supply for pneumatic signal pressure at a value which is manually variable during the control systems operation of the ram, valving and air-filled tubing means for connecting each of the pneumatic signal pressures through an elastic medium directly to said pump control and valving control means for operating said valving means to select one of said pneumatic signal pressures for connecting through said elastic medium to said pump control so that said pump may be operated and said ram moved in proportion to an infinitely variable pneumatic signal pressure that may be adjusted during said operation and movement, and so that the valve transition between different pneumatic signal pressures may be cushioned by a tubing contained air medium to provide a smooth transition in the control movements of the ram.

19. In an extrusion press including a ram cylinder, a ram, and at least one variable delivery pump having pneumatic pump control means for varying the displacement of said pump, means for connecting said pump to move said ram, and a pneumatic control system including a source of pneumatic signal pressure; a compensation system for said source of signal pressure, said compensation system adjusting said signal pressure in proportional response to changes in the output pressure of said pump within its operating range whereby the movement of said ram may be controlled and maintained despite said changes in the output pressure of said pump.

20. In an extrusion press including a ram cylinder, a ram, at least one variable delivery hydraulic pump having pneumatic pump control means for varying displacement of said pump, means for connecting said pump to move said ram, a pneumatic control system including more than one source of pneumatic signal pressure, at least one of which is manually variable and at least one of which is preset, and valving means for connecting and disconnecting each of said sources of pneumatic signal pressure separately to said control means, a slip compensation system, means for connecting said compensation system between at least one of said sources of pneumatic signal pressure and said pump control means, said compensation system including a transducer and computer for sensing changes in the hydraulic output pressure of said pump and for regulating the pneumatic signal pressure in response to said changes in the hydraulic output pressure whereby the movement of said ram may be controlled in proportion to said source of pneumatic signal pressure.

21. In an extrusion press including a ram cylinder, a ram, at least one variable delivery hydraulic pump for powering said ram having pneumatic pump control means for varying the displacement of said pump, a pneumatic control system including a source of pneumatic signal pressure, a compensation system for said source of pneumatic signal pressure, said compensation system including a computer for adjusting said pneumatic signal pressure in response to changes in the hydraulic output pressure of said pump within its operating range for extrusion whereby the action of said ram may be controlled and maintained despite said changes in the hydraulic output pressure of the pump which operates it.

22. A compensation system for a hydraulic cylinder and piston, said hydraulic cylinder and piston being connected to and powered by a variable delivery hydraulic pump, said hydraulic pump having pneumatic pump control means for varying the displacement of said pump and thereby the delivery of hydraulic fluid from said pump, said pneumatic pump control being operated by a pneumatic control system including a source of pneumatic signal pressure, said compensation system including a transducer and computer for sensing the hydraulic output pressure from said pump and for adjusting said pneumatic signal pressure in response to changes in said hydraulic output pressure of said pump within its operating range so that the movement of said piston may be controlled and maintained despite said changes in the hydraulic output pressure from said pump.

23. A slip compensation system for a hydraulic cylinder and piston, said hydraulic cylinder and piston being connected to and powered by a variable delivery hydraulic pump, said hydraulic pump having pneumatic pump control means for varying the displacement of said pump and thereby the delivery of hydraulic fluid from said pump, said pneumatic pump control means being operated by a pneumatic control system including more than one source of pneumatic signal pressure, at least one of said sources of pneumatic signal pressure being manually variable and at least one of said sources of pneumatic signal pressure being preset, said slip compensation system including means for connecting said compensation system to at least one of said sources of pneumatic signal pressure being preset, said slip compensation system including means for connecting said slip compensation system to at least one of said sources of pneumatic signal pressure, and said slip compensation system including a transducer and computer for sensing changes in the hydraulic output pressure of said pump and for regulating the pneumatic signal pressure in response to said changes in the hydraulic output pressure of said pump, there being valving means for connecting and disconnecting each of said sources of pneumatic signal pressure, including said slip compensation system, separately to said pump control means whereby the action of said piston may be controlled and maintained despite said changes in the output pressure from said pump and in proportion to said signal pressure.

References Cited by the Examiner

UNITED STATES PATENTS

| | | | |
|---|---|---|---|
| 2,103,984 | 12/37 | Indge | 60—52 XR |
| 2,265,800 | 12/41 | Connor et al. | 60—52 XR |
| 2,443,345 | 6/48 | Ernst | 60—52 XR |
| 2,459,888 | 1/49 | Lindsey | 60—52 XR |
| 2,639,585 | 5/53 | Camerata | 60—52 |

MICHAEL V. BRINDISI, *Primary Examiner.*

ROBERT F. WHITE, *Examiner.*

UNITED STATES PATENT OFFICE
CERTIFICATE OF CORRECTION

Patent No. 3,194,037                                                  July 13, 1965

William Livingston Govan

It is hereby certified that error appears in the above numbered patent requiring correction and that the said Letters Patent should read as corrected below.

Column 3, line 32, for "cyilnders" read -- cylinders --; column 4, lines 1 and 2, for "pasition" read -- position --; column 6, line 51, for "applies" read -- supplies --; column 10, line 73, for "retacted" read -- retracted --; column 11, line 56, for "an" read -- and --; column 12, line 25, for "extruscion" read -- extrusion --; line 32, for "open" read -- opened --; column 13, line 20, for "reaction" read -- retraction --; column 15, line 54, after "sources" strike out the comma.

Signed and sealed this 8th day of February 1966.

(SEAL)

Attest:

ERNEST W. SWIDER
Attesting Officer

EDWARD J. BRENNER
Commissioner of Patents